United States Patent
Meinken et al.

(10) Patent No.: US 9,945,330 B2
(45) Date of Patent: Apr. 17, 2018

(54) METHOD FOR DIAGNOSING A FUEL TANK VENT VALVE

(71) Applicant: Robert Bosch GmbH, Stuttgart (DE)

(72) Inventors: Andreas Meinken, Kornwestheim (DE); Simon Bruestle, Moeglingen (DE); Thomas Wieczorek, Remseck (DE); Johannes Kastner, Stuttgart (DE); Bernhard Deibele, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 338 days.

(21) Appl. No.: 14/711,247

(22) Filed: May 13, 2015

(65) Prior Publication Data

US 2015/0328980 A1    Nov. 19, 2015

(30) Foreign Application Priority Data

May 13, 2014  (DE) ......................... 10 2014 208 987

(51) Int. Cl.
| | |
|---|---|
| *G01B 5/28* | (2006.01) |
| *G01B 5/30* | (2006.01) |
| *F02M 25/08* | (2006.01) |
| *B60K 15/035* | (2006.01) |
| *B60K 15/03* | (2006.01) |

(52) U.S. Cl.
CPC ... *F02M 25/0809* (2013.01); *B60K 15/03519* (2013.01); *B60K 2015/03328* (2013.01)

(58) Field of Classification Search
CPC .... B60K 15/03519; B60K 2015/03328; F02M 25/0836; F02M 25/0872
See application file for complete search history.

(56) References Cited

U.S. PATENT DOCUMENTS

| | | | |
|---|---|---|---|
| 6,363,921 B1 * | 4/2002 | Cook | ................. F02M 25/0809 |
| | | | 123/519 |
| 2010/0223984 A1 * | 9/2010 | Pursifull | ............ F02M 25/0836 |
| | | | 73/114.39 |
| 2012/0152210 A1 * | 6/2012 | Reddy | .................. F02M 25/089 |
| | | | 123/520 |
| 2012/0179354 A1 * | 7/2012 | Hagen | .............. B60K 15/03519 |
| | | | 701/102 |

FOREIGN PATENT DOCUMENTS

DE          4342431          6/1995

* cited by examiner

*Primary Examiner* — Toan Le
(74) *Attorney, Agent, or Firm* — Norton Rose Fulbright US LLP; Gerard Messina

(57) ABSTRACT

A method for diagnosing a fuel tank vent valve of a motor vehicle. In the method it is inferred, from a curve of a pressure p over time in a sub-chamber of the motor vehicle after a start-up of an internal combustion engine of the motor vehicle, as to whether the fuel tank vent valve is jammed open. The sub-chamber contains a fuel tank of the motor vehicle and is delimited by the fuel tank vent valve.

6 Claims, 2 Drawing Sheets

METHOD FOR DIAGNOSING A FUEL TANK VENT VALVE

FIELD OF THE INVENTION

The present invention relates to a method for diagnosing a fuel tank vent valve of a motor vehicle. The present invention also relates to a computer program which is designed to carry out each step of the method according to the present invention, and to a machine-readable storage medium on which the computer program according to the present invention is stored. Finally, the present invention relates to an electronic control unit which is designed to carry out a diagnosis of a fuel tank vent valve of a motor vehicle with the aid of the method according to the present invention.

BACKGROUND INFORMATION

In order to protect the environment, vapors which become separated from fuels in the fuel tank of a motor vehicle must not enter the environment. In order to prevent this from happening, motor vehicles are equipped with an activated carbon filter (ACF) which is intended to adsorb these vapors. However, since these activated carbon filters cannot adsorb and store an infinite quantity of fuel vapors, it is necessary to empty or regenerate the filters. For this purpose, modern motor vehicles have fuel tank venting systems, in which fuel that has evaporated in the fuel tank is stored in an activated carbon filter which is connected to the intake manifold of the internal combustion engine via a fuel tank vent valve which may be shut off. When the fuel tank vent valve is open, air is sucked in via a connection of the activated carbon filter to the surroundings, which entrains the temporarily stored fuel and feeds it to the combustion process. Via the fuel tank vent valve, the gas quantity taken in is controlled in such a way that on the one hand the activated carbon filter is sufficiently rinsed with air and on the other hand no intolerably large disruptions occur to the fuel/air ratio of the mixture fed to the internal combustion engine.

In motor vehicles which are to be sold in the United States of America, according to the California Air Resources Board (CARB) regulations a diagnosis must be carried out on all components of a motor vehicle which are responsible for emissions. This also includes a diagnosis of the fuel tank vent valve and of a pressure sensor in the fuel tank which is required in order to diagnose tank leakages. Furthermore, the individual components must be reliably identified in the event of a defect. For this purpose, it should be noted in particular that defective components may have an effect on correctly functioning components. This could lead to the correctly functioning components being incorrectly identified as defective. For example, a defective fuel tank vent valve should not lead to the tank pressure sensor being noted as defective, and vice versa. The individual components are therefore tested with the aid of diagnostic methods and are checked for plausibility in order to be able to find an error and assign it to a component. This test of the individual components usually takes place once per driving cycle. If a component defect appears only after it has been checked, the error need not necessarily be recognized immediately but rather must be recognized in the next driving cycle.

Presently known diagnostic methods include monitoring of the fuel tank vent valve by activating the fuel tank vent valve (so-called impressing) and evaluating the resulting signal by way of an additional downstream pressure sensor or by way of the pressure sensor in the intake manifold. Another method for monitoring the fuel tank vent valve provides for observing the gas mixture which reaches a lambda sensor in the exhaust tract of the motor vehicle.

German Published Patent Application No. 43 42 431 describes a method for ascertaining a piece of information about the state of a fuel tank venting system in an internal combustion engine, in which a degree of the effect of the evaporation of fuel within the fuel tank venting system on the occurring pressure change is ascertained, and this degree is taken into account when ascertaining the information about the state of the fuel tank venting system.

SUMMARY

In the method according to the present invention for diagnosing a fuel tank vent valve of a motor vehicle, it is inferred, from a curve of a pressure over time in a sub-chamber of the motor vehicle after a start-up of an internal combustion engine of the motor vehicle, as to whether the fuel tank vent valve is jammed open. The sub-chamber contains a fuel tank of the motor vehicle and is delimited by the fuel tank vent valve. In particular, the sub-chamber contains the fuel tank, an activated carbon filter of the motor vehicle, a line which connects the fuel tank to the activated carbon filter, and a line which connects the activated carbon filter to the fuel tank vent valve. A defect of the fuel tank vent valve may in this way be quickly recognized. The diagnosis according to the present invention detects the jammed-open fuel tank vent valve shortly after start-up of the engine and may accordingly provide information about this defect. This is advantageous in particular with regard to side effects on other functions in the engine control unit. Another advantage lies in a low complexity of the test according to the present invention in comparison to the previously known diagnostic method. The test according to the present invention is much simpler since only one pressure signal has to be evaluated and therefore only a few boundary conditions influence the result.

Preferably, it is inferred that the fuel tank vent valve is jammed open if a drop in the pressure in the sub-chamber takes place during a test period after the start-up of the internal combustion engine, in particular a drop to below the ambient pressure of the motor vehicle. If the fuel tank vent valve is jammed open and the engine is started, due to the system this always results in a pressure drop in the sub-chamber. Since the fuel tank vent valve is always closed in the absence of any flow, this pressure drop may moreover only be caused by a jammed-open fuel tank vent valve. It is therefore particularly preferred that no activation of the fuel tank vent valve takes place during the test period.

The curve of the pressure over time in the sub-chamber may in particular be measured with the aid of a pressure sensor in the sub-chamber, preferably a pressure sensor in the fuel tank. Such a pressure sensor is required in any case for a customary diagnosis of tank leakages, so that the method according to the present invention may be implemented without installing any additional components.

If the motor vehicle has a start/stop function, it is preferred that, each time the internal combustion engine is restarted, it is inferred from the curve of the pressure over time in the sub-chamber as to whether the fuel tank vent valve is jammed open. This has the advantage that a defect of the fuel tank vent valve may be recognized even during a driving cycle of the motor vehicle, and not just at the start of the cycle.

The computer program according to the present invention is designed to carry out each step of the method according to the present invention, in particular when it is run on a computer or an electronic control unit. It enables the method according to the present invention to be implemented on an electronic control unit without having to make any structural changes to the latter. For this purpose, the computer program is stored in particular on the machine-readable storage medium according to the present invention.

When the computer program according to the present invention is run on an electronic control unit, the electronic control unit according to the present invention is carries out a diagnosis of a fuel tank vent valve of a motor vehicle with the aid of the method according to the present invention.

DETAILED DESCRIPTION

Figure 1:
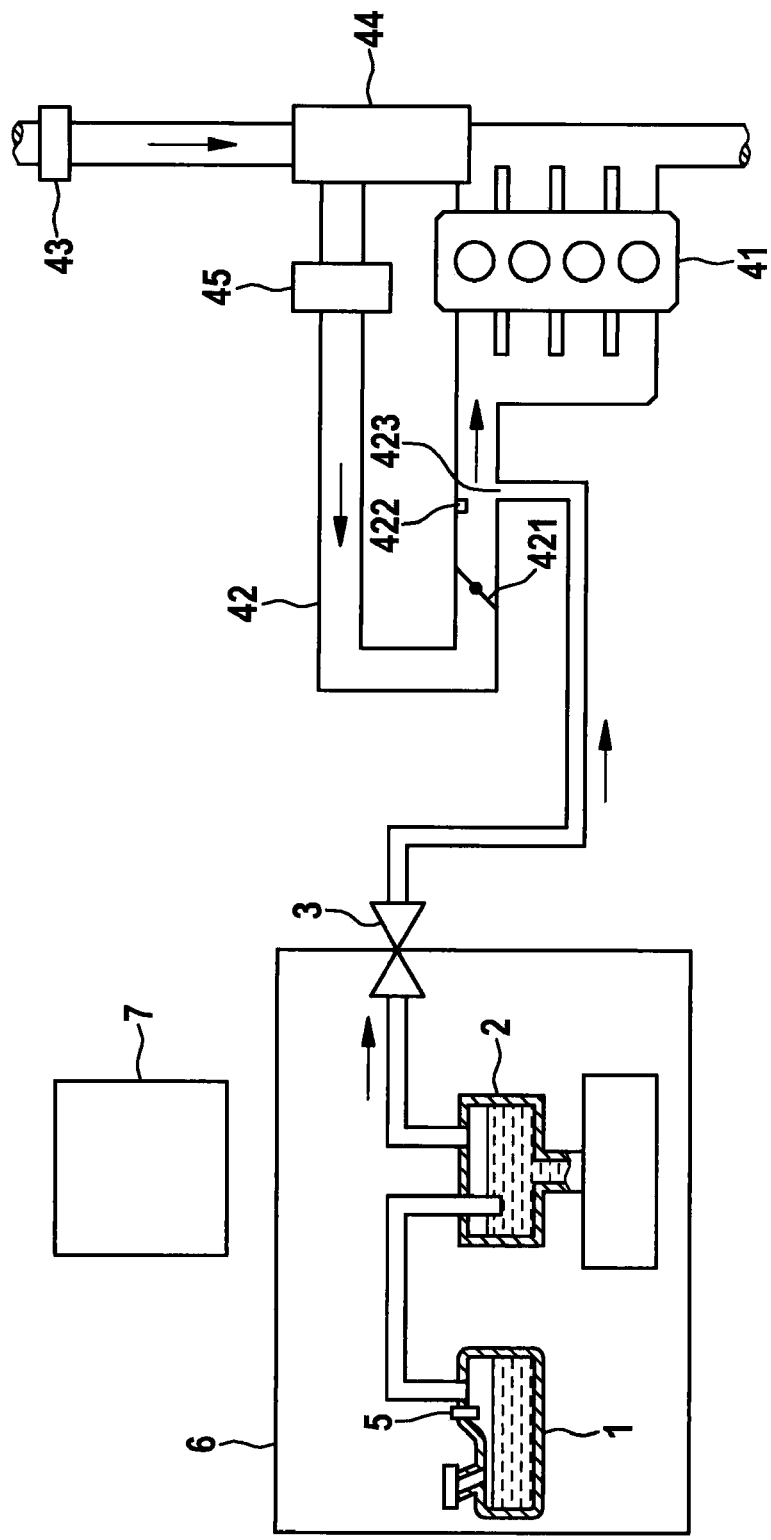
FIG. 1 shows a fuel tank venting system, whose fuel tank vent valve may be diagnosed with the aid of a method according to an exemplary embodiment of the present invention.

FIG. 1 shows a conventional fuel tank venting system of a motor vehicle. A fuel tank 1 is connected to an activated carbon filter 2. A line leads from activated carbon filter 2 to fuel tank vent valve 3. A line leads from fuel tank vent valve 3 to an intake manifold 42 of an internal combustion engine 41. Ambient air is transported into a turbocharger 44 through an air filter 43. From there, it is further conveyed through a charge air cooler 45 into intake manifold 42. A throttle valve 421 and an intake manifold pressure sensor 422 are situated in the intake manifold. The intake manifold is connected to internal combustion engine 41. Pressure sensor 5 is situated in fuel tank 1. This pressure sensor 5 measures pressure p in sub-chamber 6 of the motor vehicle, which contains fuel tank 1, activated carbon filter 2, line 11 which connects fuel tank 1 to activated carbon filter 2, and line 21 which connects activated carbon filter 2 to fuel tank vent valve 3. The illustrated components are controlled by a control unit 7.

Figure 2:
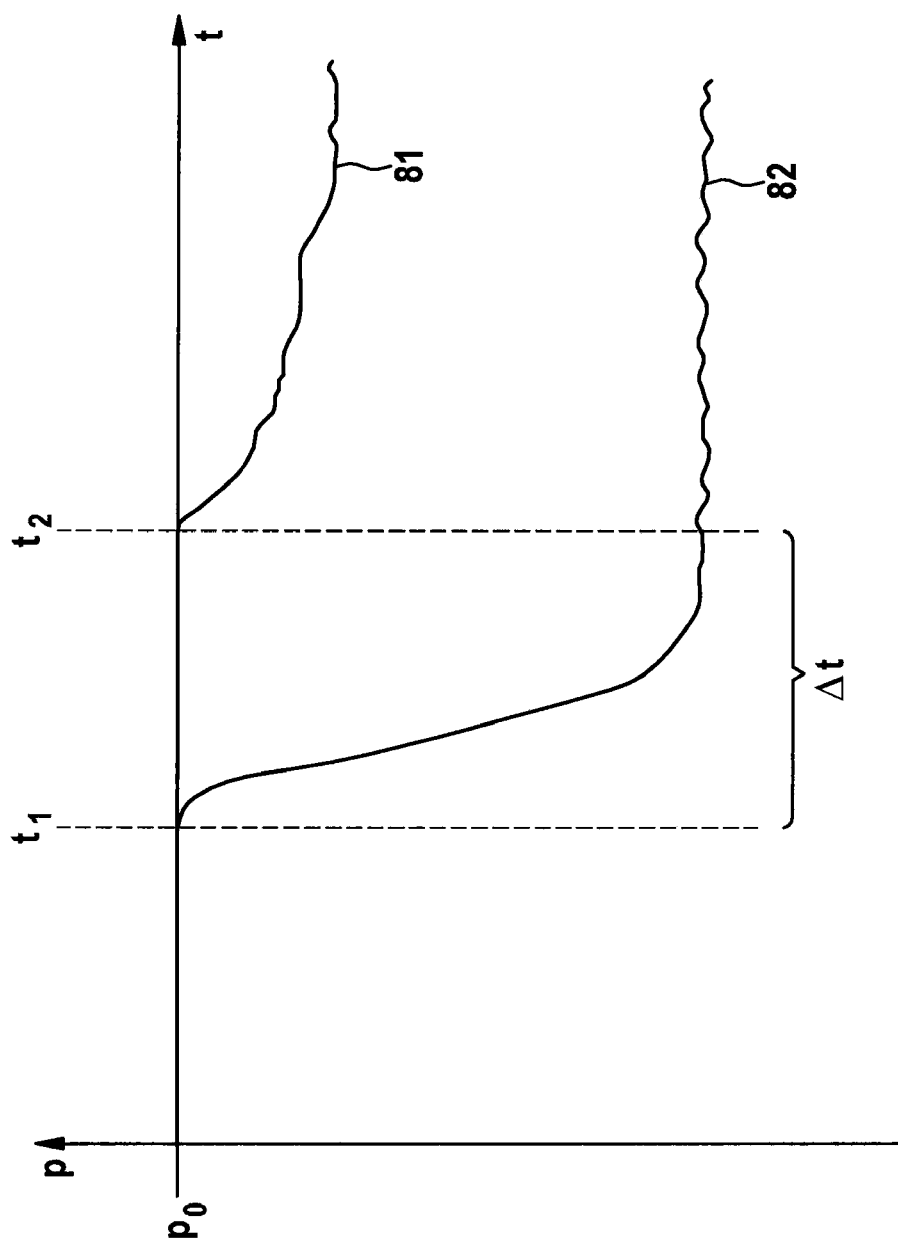
FIG. 2 shows a diagram of the curve of pressure over time in a sub-chamber of a motor vehicle in a method according to an exemplary embodiment of the present invention.

In one exemplary embodiment of the method according to the present invention, after each start-up of an internal combustion engine 41, the curve of pressure p over time t in sub-chamber 6 is measured with the aid of pressure sensor 5. If internal combustion engine 41 was switched off for a relatively long period of time, pressure p corresponds to ambient pressure $p_0$ of the motor vehicle. If fuel tank vent valve 3 is intact, pressure curve 81 shown in FIG. 2 is obtained. After a start-up of internal combustion engine 41 at point in time $t_1$, in a test period $\Delta t$ pressure p remains constant at its initial value, which corresponds to ambient pressure $p_0$. It is therefore recognized that fuel tank vent valve 3 is not jammed open. Only when fuel tank vent valve 3 is activated at point in time $t_2$ for the purpose of regenerating activated carbon filter 2 does pressure p drop, since a connection to intake manifold 42 is opened and the air flow flowing through intake manifold 42 entrains a fuel/air mixture out of activated carbon filter 2, which also results in an entrainment of air out of fuel tank 1 and thus to a drop in pressure p in sub-chamber 6.

If, however, fuel tank vent valve 3 is jammed open at the time of the start-up of internal combustion engine 41, pressure curve 82 shown in FIG. 2 occurs. As soon as internal combustion engine 41 is started at point in time $t_1$, the air is transported out of activated carbon filter 2 and fuel tank 1 into intake manifold 42, so that pressure p drops. The pressure reaches a minimum within a test period $\Delta t$. Due to this immediate drop in pressure p, it is recognized that fuel tank vent valve 3 is jammed open. By subsequently activating fuel tank vent valve 3 at point in time $t_2$, the valve cannot be opened further, so that there is also no further drop in pressure p.

Since pressure p is released again to ambient pressure $p_0$ after each switch-off of internal combustion engine 41 both in the case of an intact fuel tank vent valve 3 and in the case of a defective fuel tank vent valve 3, the described diagnosis of fuel tank vent valve 3 may be repeated after each start-up of internal combustion engine 41 in a vehicle having a start/stop function.

What is claimed is:

1. A method of a fuel tank system of a motor vehicle, the method comprising:
    in response to passage of a predefined time period after a start up of an internal combustion engine of the motor vehicle, a control unit of the system performing a control to open a fuel tank vent valve arranged between a sub-chamber that includes a fuel tank and an intake manifold;
    sensing, by a pressure sensor, a pressure p in the sub-chamber throughout the predefined time period;
    producing, by the pressure sensor, output signals corresponding to the sensed pressure p;
    determining, by the control unit and based on the signals output by the pressure sensor, that the pressure p dropped during the predefined time period prior to the control to open the fuel tank vent valve; and
    outputting, by the control unit, an error signal indicating that the fuel tank vent valve is jammed open in response to the determination that the pressure p dropped during the predefined time period prior to the control to open the fuel tank vent valve.

2. The method as recited in claim 1, wherein the sub-chamber includes an activated carbon filter of the motor vehicle, a line which connects the fuel tank to the activated carbon filter, and a line which connects the activated carbon filter to the fuel tank vent valve.

3. The method as recited in claim 1, wherein no activation of the fuel tank vent valve takes place during the predefined time period.

4. The method as recited in claim 1, wherein:
    the motor vehicle has a start/stop function; and
    the determining is performed each time the internal combustion engine is restarted.

5. A non-transitory computer-readable medium on which are stored instructions that are executable by an electronic control unit of a fuel tank system of a motor vehicle and that, when executed by the electronic control unit, cause the control unit to perform a method, the method comprising:
    in response to passage of a predefined time period after a start up of an internal combustion engine of the motor vehicle, performing a control to open a fuel tank vent valve arranged between a sub-chamber that includes a fuel tank and an intake manifold;
    obtain, from a pressure sensor, signals corresponding to a pressure p in the sub-chamber sensed by the pressure sensor throughout the predefined time period;

determining, based on the signals output by the pressure sensor, that the pressure p dropped during the predefined time period prior to the control to open the fuel tank vent valve; and outputting an error signal indicating that the fuel tank vent valve is jammed open in response to the determination that the pressure p dropped during the predefined time period prior to the control to open the fuel tank vent valve.

6. An engine system of a motor vehicle, the system comprising:
   an internal combustion engine;
   a sub-chamber including a fuel tank and a pressure sensor;
   an intake manifold;
   a fuel tank vent valve arranged between the sub-chamber and the intake manifold; and
   an electronic control unit;
   wherein:
      the electronic control unit is configured to, in response to passage of a predefined time period after a start up of the internal combustion engine, perform a control to open the fuel tank vent valve;
      the pressure sensor is configured to sense a pressure p in the sub-chamber throughout the predefined time period and produce output signals corresponding to the sensed pressure p;
      the control unit is configured to:
         determine, based on the signals output by the pressure sensor, whether the pressure p dropped during the predefined time period prior to the control to open the fuel tank vent valve; and
         where a result of the determination is positive, output an error signal in response to the determination, the error signal indicating that the fuel tank vent valve is jammed open; and
      the system is arranged so that, where the fuel tank vent valve is not jammed open, the pressure p does not drop during the predefined time period from a time of the start up of the internal combustion engine, and the pressure p drops in response to the fuel tank vent valve opening due to the control performed in response to the passage of the predefined time period.

* * * * *